United States Patent
Kaplan et al.

(10) Patent No.: US 11,704,211 B1
(45) Date of Patent: Jul. 18, 2023

(54) ERROR AVOIDANCE IN MEMORY DEVICE

(71) Applicant: Amazon Technologies, Inc., Seattle, WA (US)

(72) Inventors: Patricio Kaplan, Palo Alto, CA (US); Ron Diamant, Santa Clara, CA (US); Brian Robert Silver, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/643,292

(22) Filed: Dec. 8, 2021

(51) Int. Cl.
G06F 11/00 (2006.01)
G06F 11/20 (2006.01)

(52) U.S. Cl.
CPC ...... *G06F 11/2094* (2013.01); *G06F 2201/82* (2013.01)

(58) Field of Classification Search
CPC ............. G06F 11/0727; G06F 11/0754; G06F 11/076; G06F 11/1612; G06F 11/1666; G06F 11/2053; G06F 11/2094; G06F 11/3037; G06F 11/3058
See application file for complete search history.

(56) References Cited

U.S. PATENT DOCUMENTS

| | | | | |
|---|---|---|---|---|
| 9,842,660 | B1 * | 12/2017 | Karamcheti | G06F 11/0757 |
| 11,055,160 | B2 * | 7/2021 | Stankevichus | G06F 11/3485 |
| 2021/0279132 | A1 * | 9/2021 | Kim | G06F 12/0882 |
| 2021/0342205 | A1 * | 11/2021 | Mcguinness | G06F 11/3058 |

OTHER PUBLICATIONS

Du et al., "Combining Error Statistics with Failure Prediction in Memory Page Offlining", MEMSYS '19, Sep. 30-Oct. 3, 2019 (Year: 2019).*
Du et al., "Fault-Aware Prediction Guided Page Offlining for Uncorrectable Memory Error Prevention", 2021 IEEE 39th International Conference on Computer Design (Year: 2021).*
Du et al., "Predicting Uncorrectable Memory Errors for Proactive Replacement: An Empirical Study on Large-Scale Field Data", IEEE, 2020 16th European Dependable Computing Conference (EDCC) (Year: 2020).*
Schroeder, Bianca, et al., "DRAM Errors in the Wild: A Large-Scale Field Study", Google Publications, *SIGMETRICS* (2009) <URL: https://research.google/pubs/pub35162/>.
Utah Arch: "Field Studies of DRAM Errors", Architecture Reading Club, Fall 2012 <URL: https://arch.cs.utah.edu/arch-rd-club/dram-errors.pdf>.

* cited by examiner

*Primary Examiner* — Michael Maskulinski
(74) *Attorney, Agent, or Firm* — Weaver Austin Villeneuve & Sampson LLP

(57) ABSTRACT

Techniques for avoiding uncorrectable errors in a memory device can include detecting a correctable error pattern of a memory page of a memory device, and determining that the correctable error pattern of the memory page satisfies a page migration condition. Upon satisfying the page migration condition, write accesses to the memory page are prevented from reaching a memory controller of the memory device. The contents of the memory page are then migrated to a reserved page, and a mapping table is updated to replace accesses to the memory page with accesses to the reserved page.

18 Claims, 9 Drawing Sheets

ERROR AVOIDANCE IN MEMORY DEVICE

BACKGROUND

Computationally intensive workloads such as machine learning can consume a large amount of memory bandwidth. Such workloads are typically executed on processing circuits with multiple processing cores or computational engines that are capable of executing a large amount of parallel computations. To support the memory bandwidth demands of the processing circuits, advance memory technologies that integrate high density memories with high data access rates can be used.

BRIEF DESCRIPTION OF THE DRAWINGS

Various embodiments in accordance with the present disclosure will be described with reference to the drawings, in which.

DETAILED DESCRIPTION

Figure 1:
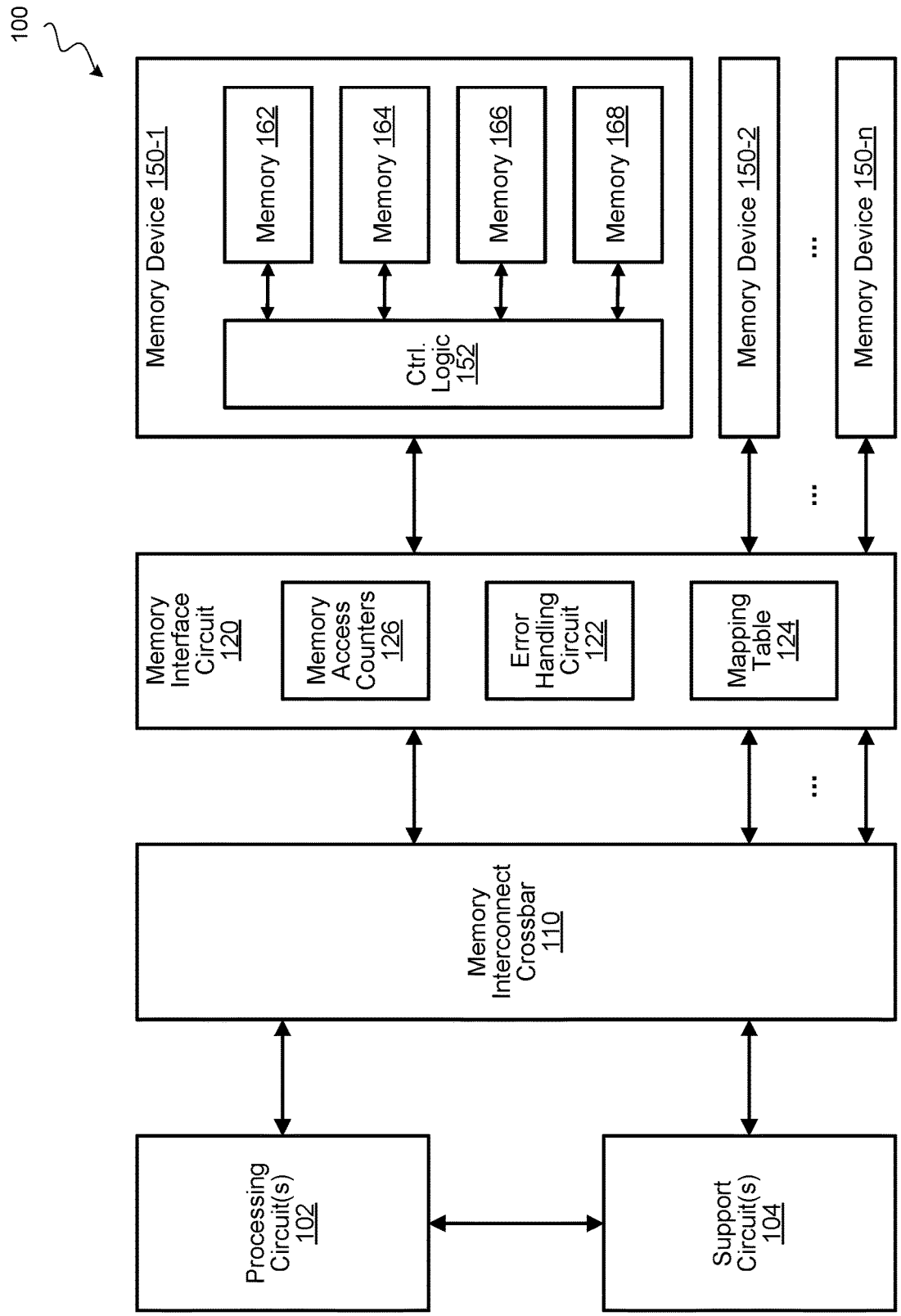
FIG. 1 illustrates a block diagram of an example of a computing system.

Advance memory technologies such as high bandwidth memory (HBM) provide multiple memory dies in a memory device, with each memory die supporting multiple memory channels. Memory devices such as HBM can be integrated with a processing circuit on a single substrate. For example, a system-on-chip can integrate a processing circuit with multiple HBM devices as well as other support circuits on a substrate to form a highly integrated computing system on a single chip. However, because such advance memory devices are an emerging technology, the long-term reliability profiles of such memory devices may not yet be known. When a failure occurs in legacy memory devices such as dual in-line memory modules (DIMMs), the memory module can simply be swapped out in the field with a new module by unplugging the failed module from a printed circuit board. Such convenience of in-field replacement of a failed memory device may not be available with advance memory devices such as HBM because they are typically soldered or bonded onto a substrate. As such, additional reliability safeguards are considered to prolong the longevity of computing systems that use advance memory technologies, and to prevent downtime and interruptions.

To improve the longevity of computing systems integrating advance memory technologies such as HBM, the techniques disclosed herein can be used to avoid uncorrectable errors from occurring in such systems. Uncorrectable errors are generally preceded by correctable errors before the memory device eventually fails. To learn the reliability profile of a memory device, a fleet of computing systems can be equipped with the same type of memory device and the fleet can be deployed for use in the field. The error rates of the memory devices can be monitored and collected over a period of time to determine a pattern of correctable errors that precedes an uncorrectable error event. For example, the data collected may reveal that an uncorrectable error on a memory page is likely to occur when a correctable error rate or error frequency reaches a certain threshold. Such a correctable error rate or frequency threshold can be used as a page migration condition.

Subsequent to determining a page migration condition, the correctable errors of a memory page can be monitored. When the correctable error pattern of a memory page satisfies the page migration condition, this may indicate that the memory page is about to fail and an uncorrectable error is likely to occur in the near future. To prevent a failure from occurring in the memory device, the memory page can be migrated to another location of the memory device. The location can be a reserved region of the memory device that is used for spare pages or redundancy. A mapping table can be updated to redirect accesses targeted for the memory page to access the new location. In this manner, uncorrectable errors in the memory device can be avoided before they occur.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates a simplified block diagram of an example of a computing system 100. In some implementations, computing system 100 can be a system-on-chip (SoC). Computing system 100 may include one or more memory devices 150-1 to 150-*n*. Each of memory devices 150-1 to 150-*n* can be a high throughput memory device such as a high-bandwidth memory (HBM). Each of memory devices 150-1 to 150-*n* may include multiple memory components. For example, memory device 150-1 may include memory dies 162, 164, 166, and 168, and each memory die can be a dynamic random access memory (DRAM). In other implementations, any of memory devices 150-1 to 150-*n* may include a different number of memory components, and/or may use a different type of memory technology.

In implementations in which memory device 150-1 is a HBM, memory dies 162, 164, 166, and 168 can be stacked together and connected using through-silicon vias (TSVs), and each of the memory dies can support multiple memory channels for low latency access. The HBM device may also include a control logic die 152. The control logic die 152 can be located at the base or on the bottom of the stack, or adjacent to the stack of memory dies on an interposer. The control logic die 152 may provide an input/output interface for the memory dies 162, 164, 166, and 168, and may include buffers and clocking circuitry for the memory stack. In some implementations, control logic die 152 can be implemented using a memory controller that is able to generate read and write commands to the memory dies based on memory access requests.

Any of memory devices 150-1 to 150-*n* may also implement internal error detection and/or error correction capabilities. For example, each of memory dies 162, 164, 166, and 168 may store error correction codes, and may have built-in capability to detect errors and notify a memory controller (e.g., control logic die 152) and/or an external component that the data being read contains an error. In some implementations, the memory dies 162, 164, 166, and 168 may also have built-in capability to correct correctable errors. In other implementations, the error detection and/or correction functions can be implemented in the control logic die 152, or implemented external to memory device 150-1.

Computing system 100 may include a memory interface circuit 120 to manage accesses to memory devices 150-1 to 150-n. For example, memory interface circuit 120 may receive memory access requests from components of computing system 100 via a memory interconnect crossbar 110, and generate read and write commands in response to those requests to access memory devices 150-1 to 150-n. In some implementations, memory interface circuit 120 may include a mapping table 124 that maps addresses or namespaces of memory access requests to physical locations in memory devices 150-1 to 150-n. Memory interface circuit 120 may also include an error handling circuit 122. For example, the error handling circuit 122 may detect and correct errors in data read from memory if the memory device does not perform error correction. In some implementations, even if a memory device performs its own error correction, error handling circuit 122 can still implement error correction functions, for example, to provide more robust error correction algorithms. Memory interface circuit 120 may also include memory access counters 126 that count the number of bytes read, and/or number of bytes written to each memory page. The memory access counters 126 may include counters that count the number of bytes over various time windows as well as a continuous total for reads and/or writes. In some implementations, memory interface circuit 120 can be implemented using a memory controller.

Memory interconnect crossbar 110 routes memory access requests from components of computing system 100 to memory devices 150-1 to 150-n. Computing system 100 may include one or more processing circuits 102 such as processor cores, execution/compute engines, accelerators, etc. that may perform computations and store data in memory devices 150-1 to 150-n, and/or one or more support circuits 104 such as direct memory access (DMA) engines, secondary processors, etc. that may write data to and/or read data from any of memory devices 150-1 to 150-n. To provide the various components of computing system 100 access to each of the memory devices 150-1 to 150-n, memory interconnect crossbar 110 can be used to direct requests from the various components of computing system 100 to the intended memory device. In some implementations, memory interconnect crossbar 110 may include buffers to temporarily store memory access requests, and a scheduler to schedule the memory access requests. Memory interconnect crossbar 110 may also include configurable access controls to grant or deny access to specific memory regions by the different components of computing system 100. In some implementations, the functionalities of memory interconnect crossbar 110 can be implemented in memory interface circuit 120.

Figure 2:
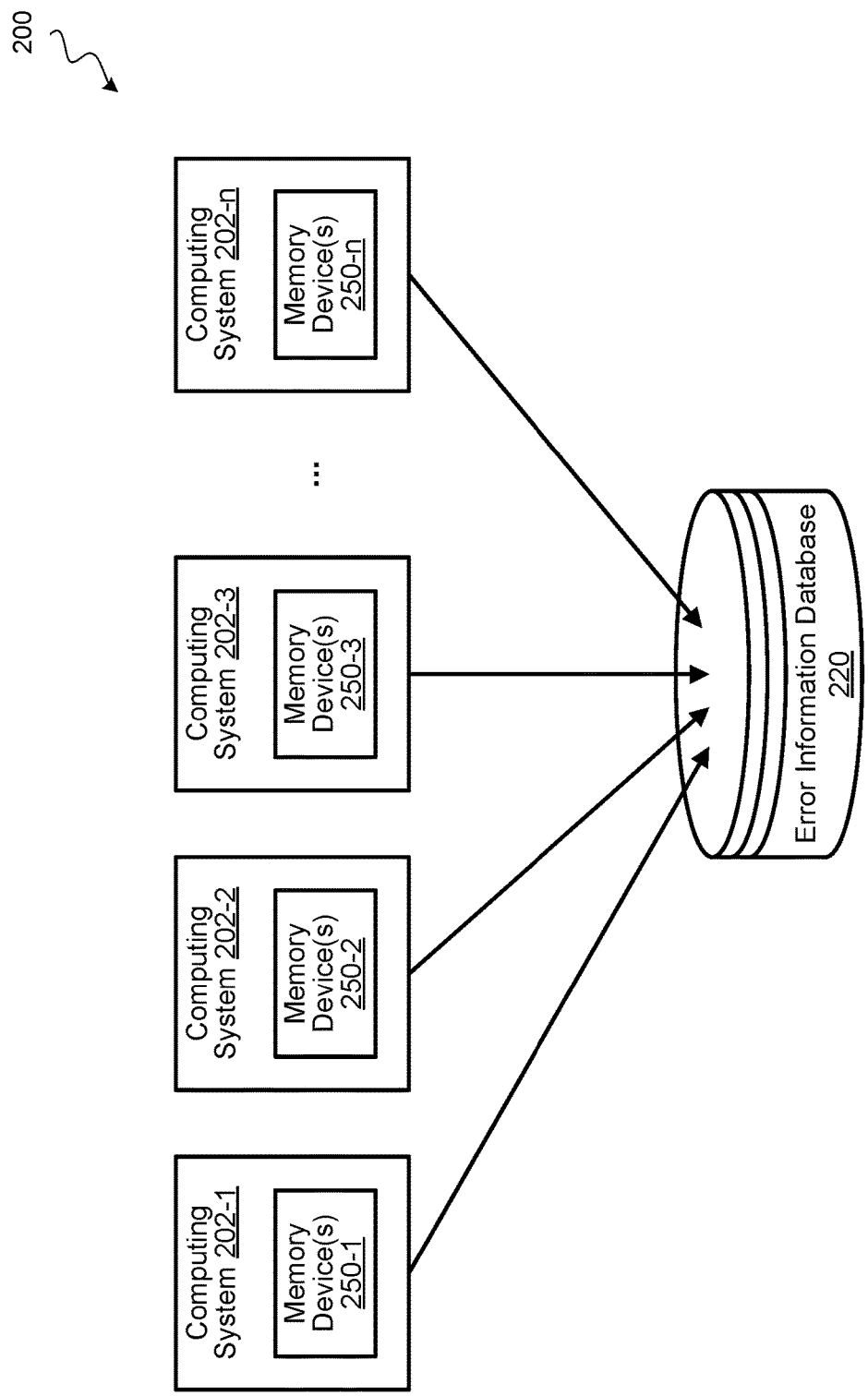
FIG. 2 illustrates an example of an environment for collecting error information.

FIG. 2 illustrates an environment 200 for collecting error information associated with multiple memory devices. Environment 200 can be, for example, a cloud computing environment or other networked environment, and may include a collection of computing systems 202-1 to 202-n, such as tens, hundreds, or even thousands of computing systems. In some implementations, computing systems 202-1 to 202-n can be a fleet of homogenous computing systems having the same or similar structure, or computing systems 202-1 to 202-n can include two or more heterogeneous computing systems having different structures. Any one or more of computing systems 202-1 to 202-n can have a structure similar to computing system 100.

Each of computing systems 202-1 to 202-n includes one or more memory devices 250-1 to 250-n, respectively. Different computing systems 202-1 to 202-n may include different number of memory devices, but the memory devices in computing systems 202-1 to 202-n includes memory devices of the same type. For example, a memory device in each of computing systems 202-1 to 202-n can be a HBM device. In some implementations, the memory device can be from the same manufacturer, the same density, and/or be manufactured using the same semiconductor processing technology.

Computing systems 202-1 to 202-n can be deployed in the field (e.g., at a centralized server location, and/or across remote locations), and be used to execute various tasks/applications, and/or to perform computations on various workloads. As memory accesses are made to memory devices 250-1 to 250-n, the operations of memory devices 250-1 to 250-n are monitored, and error data leading up to occurrences of uncorrectable error are collected on a per memory page basis over time (e.g., 1 week, 2 weeks, 1 month, 3 months, 6 months, etc.). A memory page may refer to a contiguous region of memory, or certain subdivision of memory. For example, a memory page may refer to memory cells on wordline, a group of wordlines, a memory block, multiple memory blocks, a memory partition, or other suitable granularity of continuous memory. The error data for a computing system can be stored locally on the computing system until the end of the monitoring time, and then be provided to an error information database 220 (e.g., a centralized database). In some implementations, the error data can be sent to error information database 220 intermittently or at certain intervals. The error data collection can be repeated, for example, until there is sufficient error data to recognize a certain error pattern that leads up to the uncorrectable errors.

The error data being collected can be a correctable error count of a memory page over a time period (e.g., a correctable error rate or correctable error frequency) preceding occurrences of uncorrectable error. The correctable error count may include correctable errors detected by error detection circuitry within a memory device, and/or may include correctable errors detected by error handling circuitry external to a memory device (e.g., error handling circuit 122). The error data being collected may also include the memory usage patterns correlated with the correctable errors and/or occurrences of uncorrectable errors. For example, the memory usage patterns may include counts of a number of bytes read per memory page during a time window, and/or counts of a number of bytes written per memory page during a time window (e.g., obtained from memory access counters 126). Memory usage patterns can also include rates of pre-charge cycles, refresh cycles, read-after-write cycles, write-after-read cycles, etc. In some implementations, the error data may also include operating temperature measured by a temperature sensor of the memory device correlated with the memory usage pattern and/or with the correctable/uncorrectable errors. For example, the error data may include temperature information at the time when the correctable errors and/or uncorrectable errors occur. Memory usage patterns can also include age of the memory device such as the number of hours the device has been in operation.

The error data collected and stored in error information database 220 over time can be used as historic error data to determine a page migration condition. For example, the error data can be analyzed to determine a certain correctable error rate or frequency that is likely to precede an imminent uncorrectable error, and the correctable error rate or frequency can be used as the page migration condition. In some implementations, the page migration condition may also include memory usage patterns and/or temperature information correlated with the correctable error rate or frequency. In some implementations, machine learning can be used to determine the page migration condition based on the various error data information.

As mentioned above, the error data is collected from memory devices of the same type. As such, the page migration condition will be used to initiate a page migration in the same type of memory device. In some implementations, error data for different types of memory devices, different types of memory technology, different manufactures, different memory densities, and/or different processing technology, etc. can be collected to derive a set of page migration conditions for the various classifications of memories. This can allow the uncorrectable error avoidance techniques to be used in systems that employ a combination of different memories, in which different memories will use different page migration conditions.

Upon determining a page migration condition for a certain type of memory, the page migration condition can be deployed to the various computing systems in the field such that the computing systems can monitor their memory devices for the likelihood of encounter uncorrectable errors. The collection of historic error data can continue even after a page migration condition has been determined. This can be done to improve the prediction of uncorrectable errors over time. In some implementations, the page migration condition can be updated periodically based on the continuous collection of historic error data, and the updated page migration conditions can be deployed to the computing systems when available.

Figure 3:
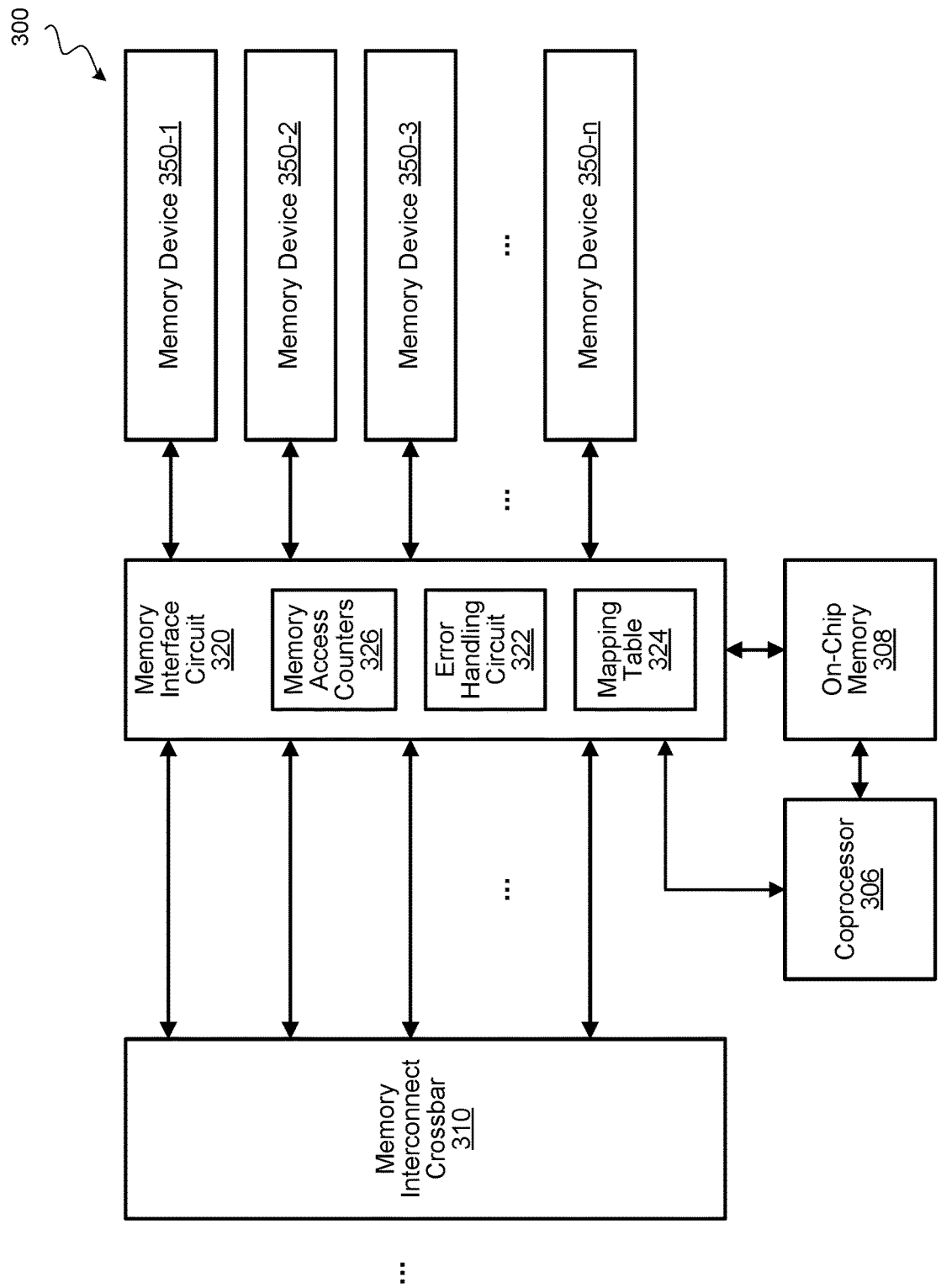
FIG. 3 illustrates a block diagram of another example of a computing system.

FIG. 3 illustrates a block diagram of an example of a computing system 300 implementing an uncorrectable error avoidance technique. Computing system 300 can be a system-on-chip (SoC), and includes one or more memory devices 350-1 to 350-n. Any of the memory devices 350-1 to 350-n can be, for example, a HBM device or other suitable type of memory device which may use legacy and/or emerging memory technologies. Computing system 300 also include a memory interconnect crossbar 310 and a memory interface circuit 320, as well as components such as processing circuit(s) and support circuit(s) similar to computing system 100 but may not be specifically shown in FIG. 3. Components similar to computing system 100 have been described above, and thus a detailed description of which need not be repeated.

Computing system 300 may include a co-processor 306 and an on-chip memory 308 such as a static random access memory (SRAM), flash memory, or other suitable on-chip memory to facilitate the uncorrectable error avoidance technique. During normal operation, correctable error information for each memory page of memory devices 350-1 to 350-n can be stored in the on-chip memory 308. For example, on-chip memory 308 may store a list of entries, with each entry corresponding to a memory page of the system. In other implementations, a different data structure can be used to store the per page correctable error information. The correctable error information for a memory page may include a correctable error count of the memory page over a time period (e.g., a correctable error rate or correctable error frequency). The correctable error information may include information on correctable errors detected by the memory devices 350-1 to 350-n, and/or correctable errors detected by a component external to the memory device such as errors detected by error handling circuit 322. In some implementations, the correctable error information may also include memory usage patterns such as counts of the number of bytes read and/or written per memory page during a time window (e.g., obtained from memory access counters 126). The correctable error information may also include operating temperature of the memory devices at the time when the memory usage patterns are captured and/or at the time of occurrence of the correctable errors.

An operating state detection process can be executed by computing system 300 (e.g., in firmware, hardware abstraction layer, and/or by coprocessor 306) to detect whether the correctable error pattern indicated in any of the entries stored in the on-chip memory satisfies the page migration condition for the type of memory device implemented in computing system 300. For example, if the page migration condition is a predetermined correctable error rate, then an entry in the on-chip memory is deemed to satisfy the page migration condition if the correctable error rate matches or exceeds that predetermined correctable error rate. Satisfying the page migration condition may indicate that the memory page is likely to encounter an uncorrectable error in the near future. When the correctable error pattern of a memory page satisfies the page migration condition, a page migration process can be initiated to move the contents of the affected memory page to a different location before the uncorrectable error occurs in the memory page and the data becomes unrecoverable.

The page migration process may include preventing write accesses to the affected memory page from reaching the memory controller of the memory device containing that page. For example, a buffer in the memory interconnect crossbar 310 can be configured to temporarily hold memory access transactions directed to the affected memory page. When a memory write access request containing an address corresponding to the affected memory page is received by memory interconnect crossbar 310 from a component of computing system 300 after the page migration process has been initiated, the memory write access request is stored in the buffer of the memory interconnect crossbar 310, and is not forwarded towards the memory device until the page migration process is complete.

Upon configuring the memory interconnect crossbar 310 to hold write accesses to the affected memory page, coprocessor 306 can migrate the contents of the affected memory page to a reserved page of the memory device. For example, coprocessor 306 may copy the data by reading data stored at the affected memory page, and writing the data to a reserved page of the memory device. In some implementations, coprocessor 306 may use a separate datapath that does not traverse through memory interconnect crossbar 310 to perform the page migration. For example, coprocessor 306 may have direct access to memory interface circuit 320, and may use a separate communication channel in memory interface circuit 320 to read and write memory devices 350-1 to 350-n.

The page migration process may also include updating mapping table 324 in memory interface circuit 320 to remap the affected memory page address to the reserved page address. In this manner, accesses directed to the affected memory page can be replaced by accesses to the reserved page. For example, when memory interface circuit 320 subsequently receives a memory access request having the memory page address, the memory page address in the memory access request can be replaced with the reserved page address based on the entry in mapping table 324. Upon updating mapping table 324, the memory interconnect crossbar 310 can be configured to release any pending requests held by to the memory interconnect crossbar 310 that are directed to the affected memory page. Any pending requests will then be redirected to the reserved page by memory interface circuit 320.

If should be noted that although computing system 300 uses an on-chip memory 308 to store the per page correctable error information, other implementations may use a portion of any of memory devices 350-1 to 350-n to store the per page correctable error information. Furthermore, in some implementations, the page migration functionality of coprocessor 306 can be implemented in a controller or an embedded processor of the memory interface circuit 320.

Figure 4:
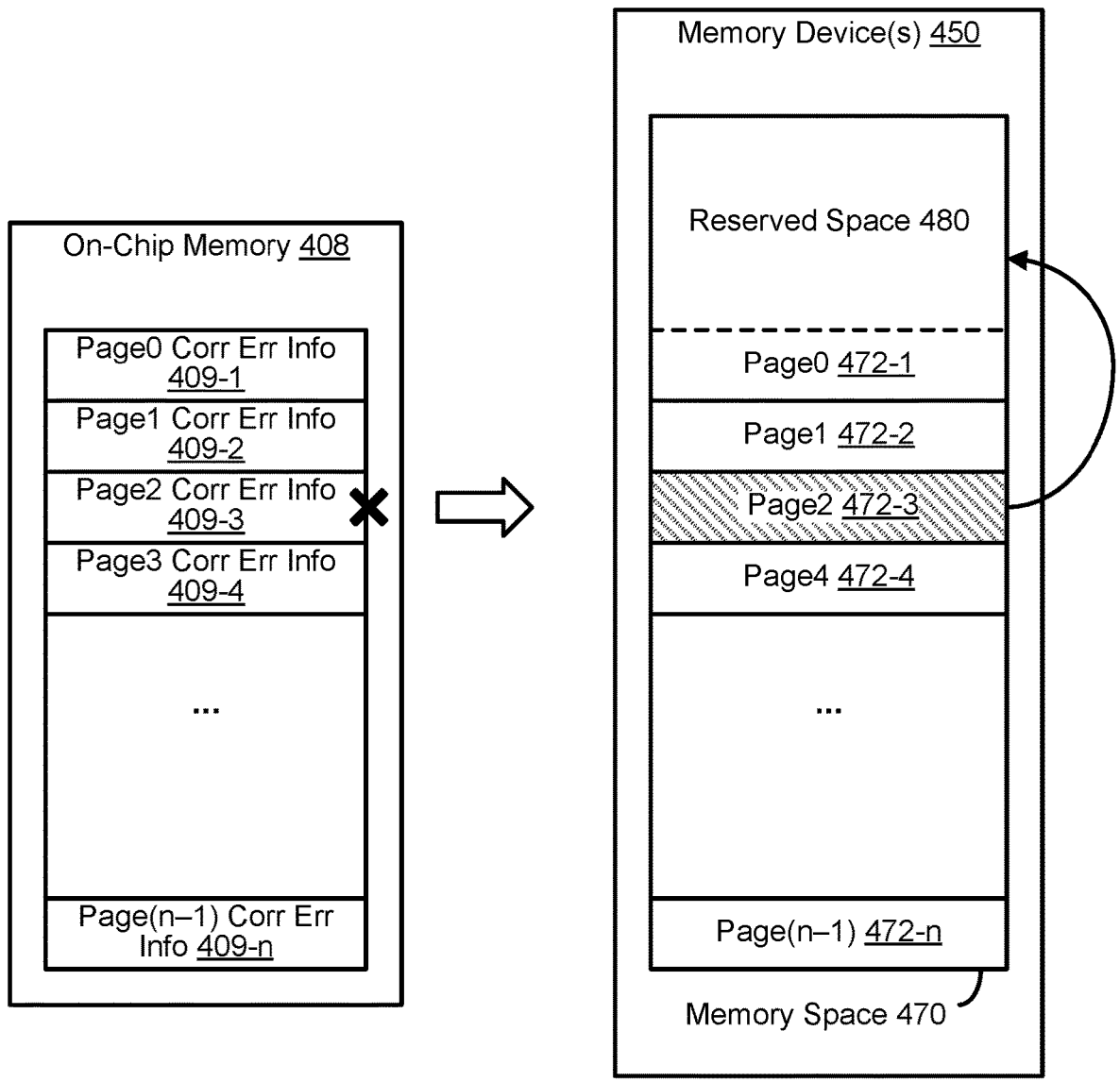
FIG. 4 illustrates a conceptual diagram of an example of a page migration.

FIG. 4 illustrates a conceptual diagram of an example of a memory page migration. Memory device(s) 450 represent the one or more memory devices in a computing system (e.g., computing system 300). Collectively, memory devices(s) 450 can provide a memory space 470 for the computing system. A portion of the memory space 470 can be reserved as reserved space 480 for redundancy and be used as spare pages for page migration. Although reserved space 480 is shown at the beginning of the memory space 470 in FIG. 4, reserved space 480 can be located elsewhere in the memory space, and may also include non-contiguous portions. For example, in a system with multiple memory devices and/or memory components inside a memory device, reserved space 480 can be formed using spare pages from each memory component or memory device. In some implementations, reserved space 480 can be implemented entirely in one memory component/device, or in a subset of the memory components/devices in the system. The remaining portion of memory space 470 can be organized as n number of memory pages 472-1 to 472-n.

On-chip memory 408 may store a set of n entries 409-1 to 409-n corresponding to the number of memory pages 472-1 to 472-n in memory space 470. Each entry is used to store correctable error information for the corresponding memory page of memory space 470. The correctable error information may include the number of correctable errors detected in the memory page over a time window to represent a correctable error rate or frequency. The correctable error information may also include time and temperature information associated with the correctable errors detected for the memory page. In some implementations, the correctable error information may also include memory usage patterns.

By way of example, suppose the correctable error pattern in entry 409-3 for memory page 2 satisfies a page migration condition (as indicated by the "X"), a page migration process can be initiated to copy the contents of memory page 472-3 to a reserved page in reserved space 480. A mapping table can be updated with the address of the reserved page in reserved space 480 to remap subsequent memory access requests from memory page 472-3 to the reserved page in reserved space 480. The reserved page can be in the same memory device or component as the affected memory page, or can be located at a different memory component in the same memory device or at a different memory device.

In some implementations, memory space 470 may include memory pages from memory devices of different types, different manufacturers, different density, and/or different process technology. In such scenarios, on-chip memory 408 may additionally store a classification identifier associated with each entry to indicate the classification of the corresponding memory page. For example, if there are memory devices from different manufacturers, the classification identifier can be used to identify which manufacturer is associated with the corresponding memory page. The classification identifier can also be used to indicate the proper page migration condition for the particular class of memory device. In other words, memory pages belong to different classes of memory may use different page migration conditions to trigger a page migration to avoid an uncorrectable error. For example, memory devices from different manufactures may have a different correctable error rate threshold before an uncorrectable error is likely to occur, and the classification identifier can be used as an index to lookup or retrieve the correctable error rate for the manufacturer associated with the memory page.

Figure 5:
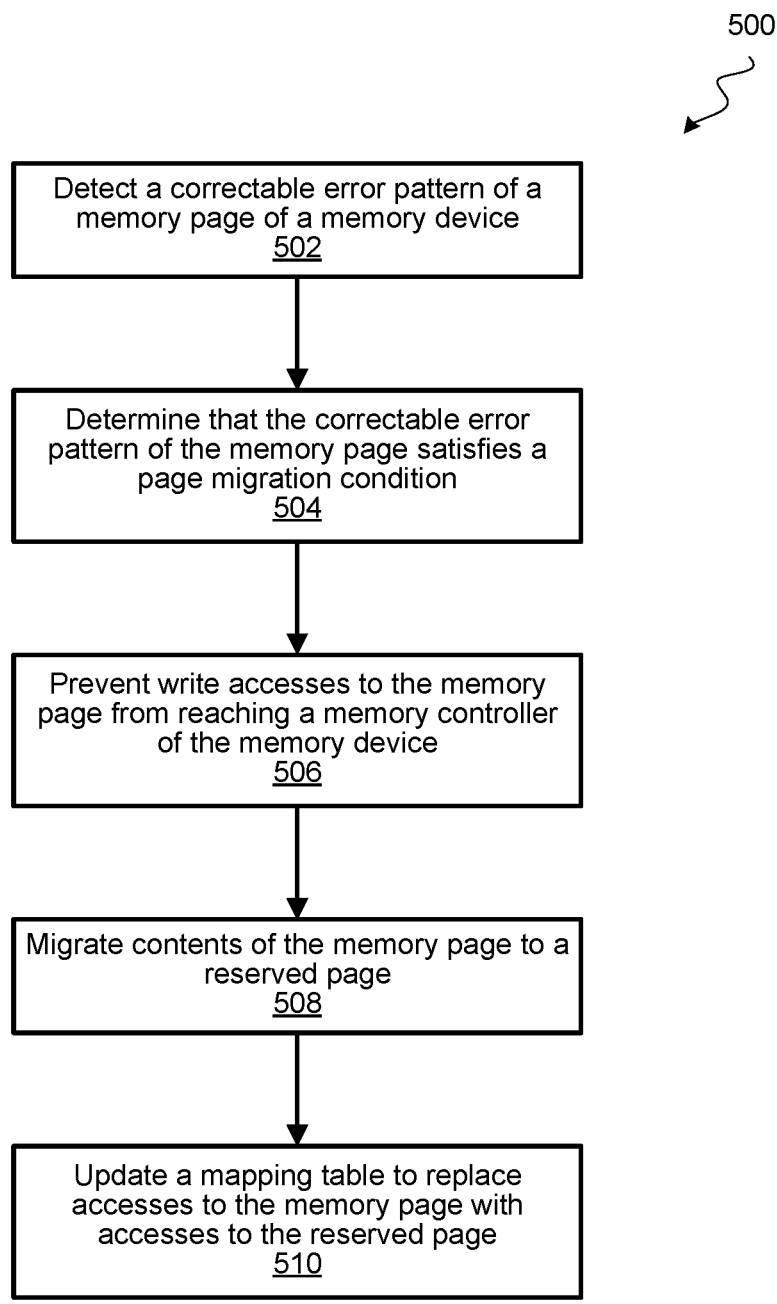
FIG. 5 illustrates a flow diagram of an example of an error avoidance process.

FIG. 5 illustrates a flow diagram of an example of a process 500 for avoiding occurrences of uncorrectable errors in a memory device. Process 500 can be performed, for example, by a computing system having one or more memory devices, and a processing circuit that performs computations and store data in the one or more memory devices. In some implementations, the computing system can be a system-on-chip (SoC). In some implementation, the computing system may also include a coprocessor to offload at least some of the tasks associated with process 500 from the processing circuit. Process 500 can be performed as a background process without interrupting the execution of applications or other tasks of the computing system.

To avoid uncorrectable errors in a memory device, historic error data of multiple memory devices of the same type or classification can be collected over a time period. The historic error data can include usage patterns and correctable error rates that precede uncorrectable errors. A page migration condition can be determined based on the historic error data, and the page migration condition. Once a page migration condition has been established, process 500 can be initiated.

Process 500 may begin at block 502 by detecting a correctable error pattern of a memory page of the memory device. The correctable error pattern can be detected, for example, by monitoring correctable errors of a memory page of the memory device. The correctable errors can be detected by internal error detection circuitry of the memory device, or by components external to the memory device such as memory interface logic or a memory controller. The correctable errors can be counted over various time periods to obtain a correctable error rate or a correct error frequency. In some implementations, the correctable error pattern may also include usage patterns to the memory page which can be obtained, for example, by monitoring the number of bytes read and/or written over various time windows, as well as the operating temperature of the memory device at various events. Information associated with the correctable error pattern can be collected and stored in an on-chip memory and be updated as operation of the memory device proceeds. In some implementations, the information can be stored in one of the memory devices.

At block 504, a determination is made as to whether the correctable error pattern of the memory page satisfies a page migration condition. For example, the correctable error rate of the memory page can be compared with a correctable error rate threshold, and the page migration condition is met if the correctable error rate of the memory page is equal to or exceeds the threshold. In some implementations, the correctable error pattern of the memory page can be checked at periodic intervals or at certain system events to determine if the page migration condition is met. In some implementations, the correctable error pattern of the memory page can be checked at various time durations after the computing system has been put into operation.

At block 506, when the correctable error pattern of a memory page satisfies the page migration condition, write accesses to the memory page can be prevented from reaching a memory controller of the memory device. For example, memory write requests to the memory page can be blocked at a memory interconnect crossbar that receives memory access requests for components of the computing system. The memory write requests can be temporarily held at a buffer while the memory page is being migrated.

At block 508, the contents of the memory page are migrated to a reserved page. The reserved page is typically not used during normal operation until a page migration condition for a memory page is met. The reserved page can be a page located in the same memory device or component as the memory page being migrated, or can be located at a different memory device or component. In some implementations, a coprocessor can be used to perform the page migration by reading data stored at the memory page and writing the data to the reserved page. In some implementations, the page migration can be performed using a separate datapath that does not go through the memory interconnect crossbar.

At block 510, a mapping table can be updated such that accesses to the memory page can be replaced with accesses to the reserved page. For example, the address of the memory page can be remapped to the address of the reserved page. In some implementations, the mapping table can be implemented a memory interface circuit that receives memory access requests from a memory interconnect crossbar, and the memory interface circuit can redirect memory accesses targeted for the memory page to the reserved page.

Although certain aspects of the uncorrectable error avoidance techniques have been described using HBM as an example of the memory device, the techniques disclosed herein can be used with other types of memories including legacy memories, and memories that may use a different storage technology than DRAM.

Figure 6:
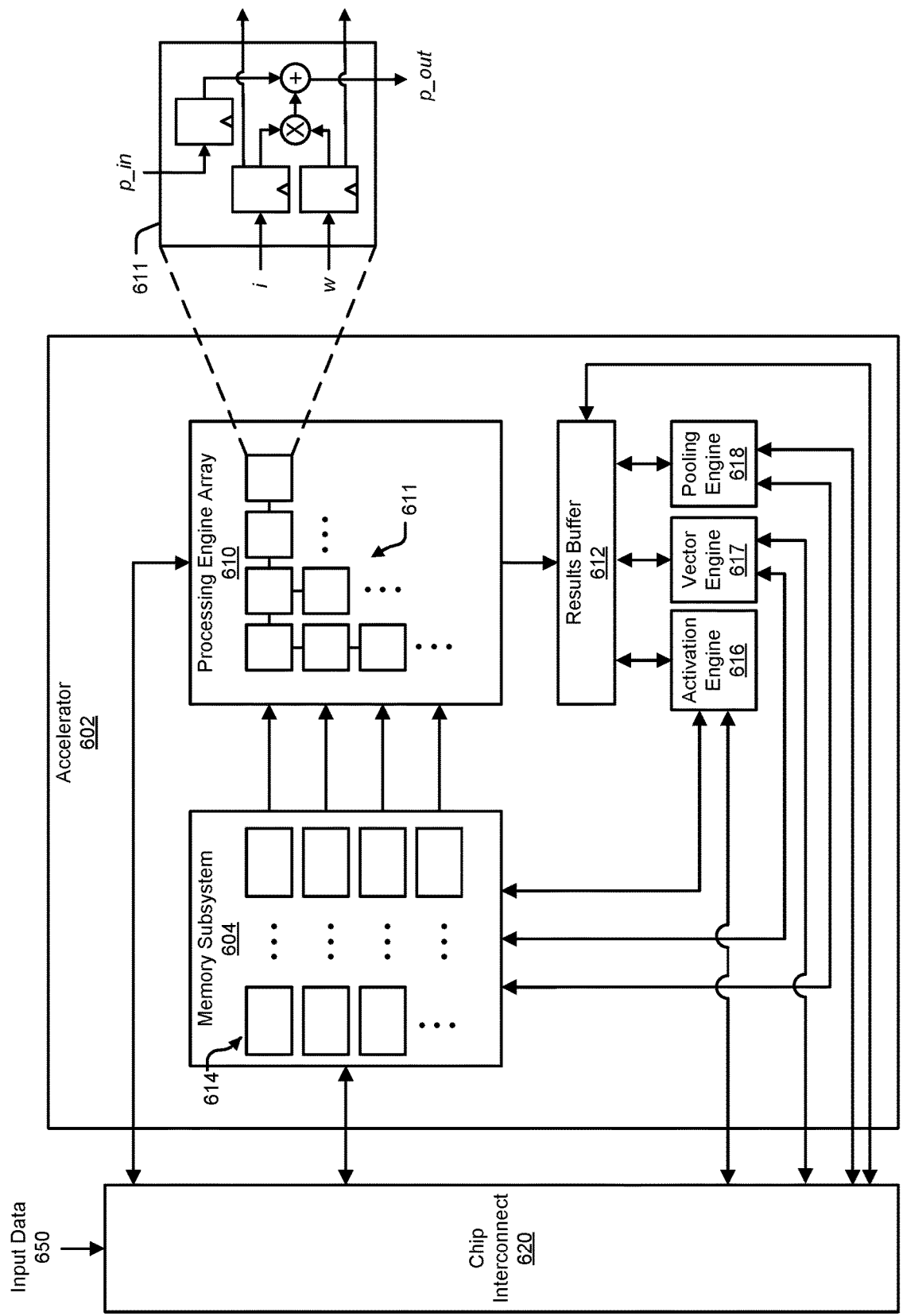
FIG. 6 illustrates a block diagram of an example of an integrated circuit device.

FIG. 6 is a block diagram illustrating an example of an integrated circuit device that can be implemented as a processing circuit that performs computations and stores data in one or more memory devices (e.g., HBM). The example of FIG. 6 illustrates an accelerator 602. In various examples, the accelerator 602, for a set of input data (e.g., input data 650), can execute computations using a processing engine array 610, an activation engine 616, a vector engine 617, and/or a pooling engine 618. In some examples, the example accelerator 602 may be an integrated circuit component of a processor, such as a neural network processor. The processor may have other integrated circuit components, including additional accelerator engines.

In various implementations, the memory subsystem 604 can include multiple memory banks 614. In these implementations, each memory bank 614 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 614. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 604 can permit simultaneous access to the read or write channels of multiple memory banks. As another example, the memory subsystem 604 can include arbitration logic such that arbitration between, for example, the outputs of multiple memory banks 614 can result in more than one memory bank's output being used. In these and other examples, though globally managed by the memory subsystem 604, each memory bank can be operated independently of any other.

Having the memory banks 614 be independently accessible can increase the efficiency of the accelerator 602. For example, values can be simultaneously read and provided to each row of the processing engine array 610, so that the entire processing engine array 610 can be in use in one clock cycle. As another example, the memory banks 614 can be read at the same time that results computed by the processing engine array 610 are written to the memory subsystem 604. In contrast, a single memory may be able to service only one read or write at a time. With a single memory, multiple clock cycles can be required, for example, to read input data for each row of the processing engine array 610 before the processing engine array 610 can be started.

In various implementations, the memory subsystem 604 can be configured to simultaneously service multiple clients, including the processing engine array 610, the activation engine 616, the vector engine 617, the pooling engine 618, and any external clients that access the memory subsystem 604 over a communication fabric 620. In some implementations, being able to service multiple clients can mean that the memory subsystem 604 has at least as many memory banks as there are clients. In some cases, each row of the processing engine array 610 can count as a separate client. In some cases, each column of the processing engine array 610 can output a result, such that each column can count as a separate write client. In some cases, output from the processing engine array 610 can be written into the memory banks 614 that can then subsequently provide input data for the processing engine array 610. As another example, the activation engine 616, the vector engine 617, and the pooling engine 618 can include multiple execution channels, each of which can be separate memory clients. The memory banks 614 can be implemented, for example, using static random access memory (SRAM).

In various implementations, the memory subsystem 604 can include control logic. The control logic can, for example, keep track of the address spaces of each of the memory banks 614, identify memory banks 614 to read from or write to, and/or move data between the memory banks 614. In some implementations, memory banks 614 can be hardwired to particular clients. For example, a set of memory banks 614 can be hardwired to provide values to the rows of the processing engine array 610, with one memory bank servicing each row. As another example, a set of memory banks can be hard wired to receive values from columns of the processing engine array 610, with one memory bank receiving data for each column.

The processing engine array 610 is the computation matrix of the example accelerator 602. The processing engine array 610 can, for example, execute parallel integration, convolution, correlation, and/or matrix multiplication, among other things. The processing engine array 610 includes multiple processing engines 611, arranged in rows and columns, such that results output by one processing engine 611 can be input directly into another processing engine 611. Processing engines 611 that are not on the outside edges of the processing engine array 610 thus can receive data to operate on from other processing engines 611, rather than from the memory subsystem 604.

In various examples, the processing engine array 610 uses systolic execution, in which data arrives at each processing engine 611 from different directions at regular intervals. In some examples, input data can flow into the processing engine array 610 from the left and weight values can be loaded at the top. In some examples weights and input data can flow from the left and partial sums can flow from top to bottom. In these and other examples, a multiply-and-accumulate operation moves through the processing engine array 610 as a diagonal wave front, with data moving to the right and down across the array. Control signals can be input at the left at the same time as weights, and can flow across and down along with the computation.

In various implementations, the number of columns in the processing engine array 610 determines the computational capacity of the processing engine array 610, and the number of rows determines the required memory bandwidth for achieving maximum utilization of the processing engine array 610. The processing engine array 610 can have, for example, 64 columns and 128 rows, or some other number of columns and rows.

An example of a processing engine 611 is illustrated in FIG. 6 in an inset diagram. As illustrated by this example, a processing engine 611 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 611.

In the illustrated example, an input from above can include a partial sum, pin, provided either from another processing engine 611 or from a previous round of computation by the processing engine array 610. When starting a computation for a new set of input data, the top row of the processing engine array 610 can receive a fixed value for p_in, such as zero. As illustrated by this example, i and w are multiplied together and the result is summed with p_in to produce a new partial sum, p_out, which can be input into another processing engine 611. Various other implementations of the processing engine 611 are possible.

Outputs from the last row in the processing engine array 610 can be temporarily stored in the results buffer 612. The results can be intermediate results, which can be written to the memory banks 614 to be provided to the processing engine array 610 for additional computation. Alternatively, the results can be final results, which, once written to the memory banks 614 can be read from the memory subsystem 604 over the communication fabric 620, to be output by the system.

In some implementations, the accelerator 602 includes an activation engine 616. In these implementations, the activation engine 616 can combine the results from the processing engine array 610 into one or more output activations. For example, for a convolutional neural network, convolutions from multiple channels can be summed to produce an output activation for a single channel. In other examples, accumulating results from one or more columns in the processing engine array 610 may be needed to produce an output activation for a single node in the neural network. In some examples, activation engine 616 can be bypassed.

In various examples, the activation engine 616 can include multiple separate execution channels. In these examples, the execution channels can correspond to the columns of the processing engine array 610, and can perform an operation on the outputs of a column, the result of which can be stored in the memory subsystem 604. In these examples, the activation engine 616 may be able to perform between 1 and n parallel computations, where n is equal to the number of columns in the processing engine array 610. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 602 can include a pooling engine 618. Pooling is the combining of outputs of the columns of the processing engine array 610. Combining can include for example, computing a maximum value, a minimum value, an average value, a median value, a summation, a multiplication, or another logical or mathematical combination. In various examples, the pooling engine 618 can include multiple execution channels that can operating on values from corresponding columns of the processing engine array 610. In these examples, the pooling engine 618 may be able to perform between 1 and n parallel computations, where n is equal to the number of columns in the processing engine array 610. In various examples, execution channels of the pooling engine 618 can operate in parallel and/or simultaneously. In some examples, the pooling engine 618 can be bypassed.

In some implementations, the accelerator 602 can further include a vector engine 617. Vector engine 617 is a compute engine that can perform computations and manipulations on values stored in memory subsystem 604 and/or results buffer 612 such as values representing matrices of input values, weight values, intermediate results, etc. Vector engine 617 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 617 can operate in parallel and/or simultaneously. In some examples, the vector engine 617 can be bypassed or be omitted.

Herein, the activation engine 616, the vector engine 617, and the pooling engine 618 may be referred to collectively as execution engines. The processing engine array 610 is another example of an execution engine. Another example of an execution engine is a Direct Memory Access (DMA) engine, which may be located outside the accelerator 602.

Input data 650 can arrive over the communication fabric 620. The communication fabric 620 can connect the accelerator 602 to other components of a processor, such as a DMA engine that can obtain input data 650 from an Input/Output (I/O) device, a storage drive, or a network interface. The input data 650 can be, for example one-dimensional data, such as a character string or numerical sequence, or two-dimensional data, such as an array of pixel values for an image or frequency and amplitude values over time for an audio signal. In some examples, the input data 650 can be three-dimensional, as may be the case with, for example, the situational information used by a self-driving car or virtual reality data. In some implementations, the memory subsystem 604 can include a separate buffer for the input data 650.

In some implementations, the input data 650 can be stored in the memory banks 614 when the accelerator 602 receives the input data 650.

In some examples, the accelerator 602 can implement a neural network processing engine. In these examples, the accelerator 602, for a set of input data 650, can execute a neural network to perform a task for which the neural network was trained. Executing a neural network on a set of input data can be referred to as inference or performing inference.

The weights for the neural network can be stored in the memory subsystem 604, along with input data 650 on which the neural network will operate. The neural network can also include instructions, which can program the processing engine array 610 to perform various computations on the weights and the input data. The instructions can also be stored in the memory subsystem 604, in the memory banks 614 or in a separate instruction buffer. The processing engine array 610 can output intermediate results, which represent the outputs of individual layers of the neural network. In some cases, the activation engine 616, the vector engine 617, and/or pooling engine 618 may be enabled for computations called for by certain layers of the neural network. The accelerator 602 can store the intermediate results in the memory subsystem 604 for inputting into the processing engine array 610 to compute results for the next layer of the neural network. The processing engine array 610 can further output final results from a last layer of the neural network. The final results can be stored in the memory subsystem 604 and then be copied out to host processor memory or to another location.

Figure 7:
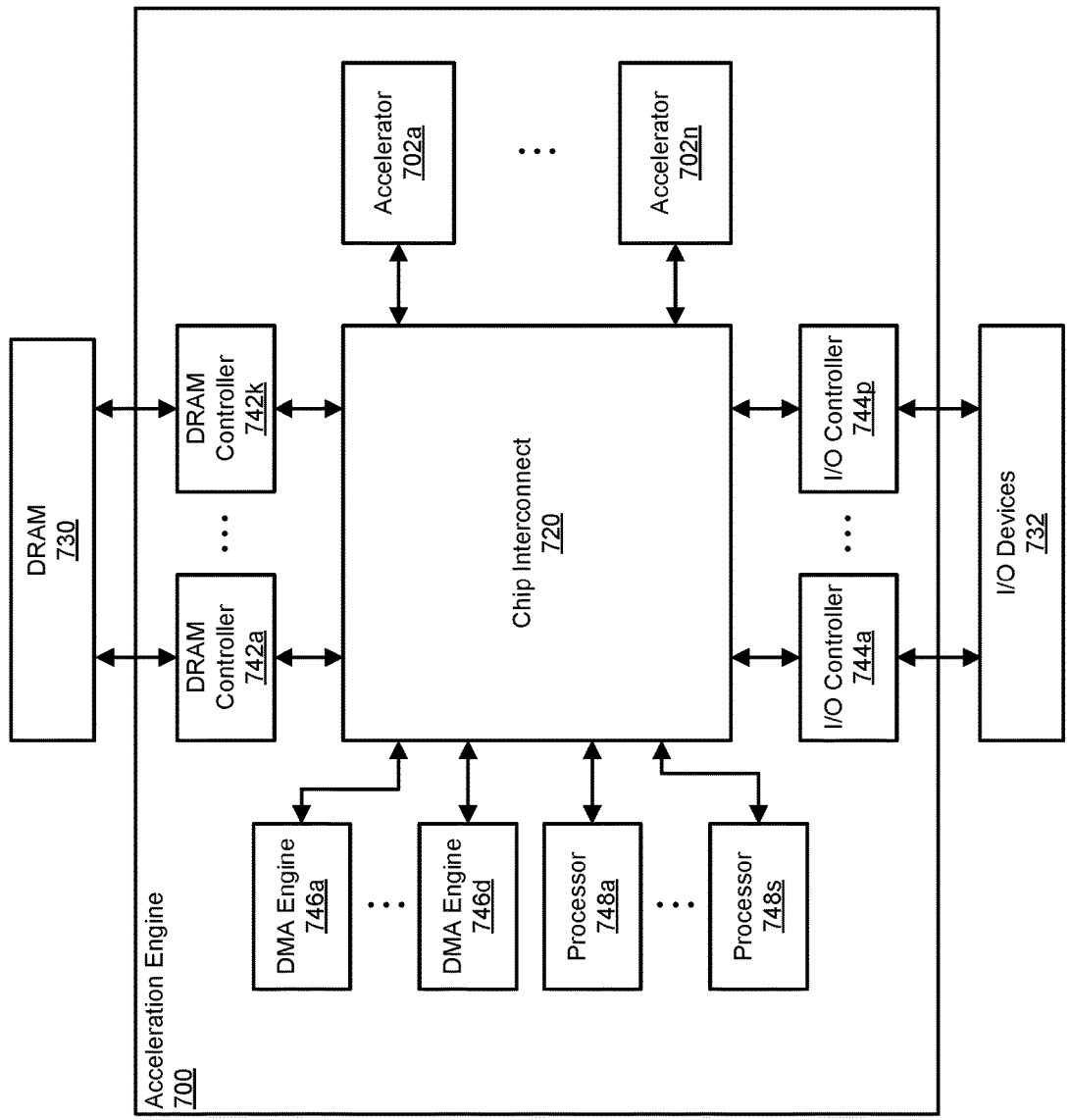
FIG. 7 illustrates a block diagram of an example of an acceleration engine.

FIG. 7 includes a block diagram that illustrates an example of an acceleration engine 700. The acceleration engine 700 is an example of an integrated circuit that can include one or more accelerators 702a-702n that may be similar to the accelerator illustrated in FIG. 6.

In the example of FIG. 7, the acceleration engine 700 includes multiple accelerators 702a-702n, each of which can perform a set of operations. In various examples, the accelerators 702a-702n are for particular types of operations, so that the accelerators 702a-702n can perform the operations much faster than when similar operations are performed by a general purpose processor. In various examples, to perform a set of operations, input data on which the operations are to be performed must first be moved into the accelerators 702a-702n. Additionally, in some cases, program code is also moved into the accelerators 702a-702n, which programs the operations that the accelerators 702a-702n will perform on the data. In the illustrated example, the acceleration engine 700 includes n accelerators 702a-702n. Examples of accelerators that can be included in the acceleration engine 700 include graphics accelerators, floating point accelerators, neural network accelerators, and others. In various examples, the accelerators 702a-702n can each be the same (e.g., each of the accelerators 702a-702n is a graphics accelerator) or can be different (e.g., the accelerators 702a-702n include a graphics accelerator, a floating point accelerator, and neural network accelerator).

The example acceleration engine 700 further includes DRAM controllers 742a-742k for communicating with an external memory. The external memory is implemented, in this example, using DRAM 730. In some implementations, DRAM 730 can be implements using high bandwidth memory (HBM). In the illustrated example, the acceleration engine 700 includes k DRAM controllers 742a-742k, each of which may be able to communicate with an independent set of banks of DRAM. In other examples, other types of RAM technology can be used for the external memory. The DRAM controllers 742a-742k can also be referred to as memory controllers.

In various examples, input data and/or program code for the accelerators 702a-702n can be stored in the DRAM 730. Different programs can cause the accelerators 702a-702n to perform different operations. For example, when one of the accelerators is a neural network accelerator, one program can configure the neural network accelerator to perform speech recognition while another program can configure the neural network accelerator to perform image recognition. In various examples, different accelerators 702a-702n can be programmed with different programs, so that each performs a different set of operations. In various examples, the processors 748a-748s can manage moving of program code from the DRAM 730 to the accelerators 702a-702n.

The example acceleration engine 700 further includes I/O controllers 744a-744p for communicating with I/O devices 732 in the system. The acceleration engine 700 can communicate with I/O devices over, for example, a processor bus. In some examples, the processor bus can be implemented using Peripheral Component Interconnect (PCI) and/or a variation of the PCI bus protocol. The processor bus can connect the acceleration engine 700 to I/O devices such as, for example, input and output devices, memory controllers, storage devices, and/or network interface cards, among other things. In some examples, the I/O controllers 744-744p can enable the acceleration engine 700 to act as an I/O device for a host processor. For example, the acceleration engine 700 can be the recipient of input data from the host processor, and a command indicating an operation to be performed on the input data (e.g., a particular computation or analysis). In the illustrated example, the acceleration engine 700 includes p I/O controllers 744a-744p, each of which may include a separate root complex and may communicate with a separate set of I/O devices 732. In other examples, other standardized bus protocols, such as Ultra Path Interconnect (UPI) can be used for the host bus. In other examples, a proprietary bus protocol can be used.

Movement of data in the acceleration engine 700 can be managed by one or more processors 748a-748s, which can also be referred to as data management processors. In the example of FIG. 7, the acceleration engine 700 includes s processors 748a-748s incorporated into the device (e.g., on the same silicon die). In other examples, the processors 748a-748s can be external to the acceleration engine 700 (e.g., on a different die and/or in a different package). In some examples, the processors 748a-748s can manage the movement of data from I/O devices 732 to the accelerators 702a-702n or the DRAM 730. For example, input data may be located at an I/O device 732 or in processor memory, and the processors 748a-748s can move the input from the I/O device 732 or processor memory into an accelerator or into DRAM 730. As another example, program code for the accelerators 702a-702n may be located on an I/O device 732 or in processor memory.

The example acceleration engine 700 further includes DMA engines 746a-746d that can move data between the accelerators 702a-702n, DRAM controllers 742a-742k, and I/O controllers 744a-744p. In the illustrated example, the acceleration engine 700 includes d DMA engines 746a-746d. In some implementations, the DMA engines 746a-746d can be assigned to specific tasks, such as moving data from the DRAM controllers 742a-742d to the accelerators 702a-702n, or moving data between the I/O controllers 744a-744p and the accelerators 702a-702n. These tasks can be assigned, for example, by enqueueing descriptors with the DMA engines 746a-746d, where a descriptor identifies an address for a block of data and an operation (e.g., a read or a write) to perform. A descriptor, for example, can direct a DMA engine to instruct a DMA controller to read a block of data from DRAM 730. A descriptor can, as a further example, instruct the DMA engine to write data, read by the DMA controller, to an accelerator. Further descriptors can be used to move data from an accelerator to DRAM 730.

In various examples, each of the processors 748a-748s can be responsible for managing the data movement for a different accelerator. In some examples, a processor may manage the data movement for more than one accelerator. Similarly, in various examples, each of the processors 748a-748s can be assigned to one or more DMA engines 746a-746d. In these and other examples, associations between processors 748a-748s, accelerators 702a-702n, and DMA engines 746a-746d are determined by program code being executed by each respective processor.

In the example acceleration engine 700, the various components can communicate over a chip interconnect 720. The chip interconnect 720 primarily includes wiring for routing data between the components of the acceleration engine 700. In some cases, the chip interconnect 720 can include a minimal amount of logic, such as multiplexors to control the direction of data, flip-flops for handling clock domain crossings, and timing logic.

Figure 8:
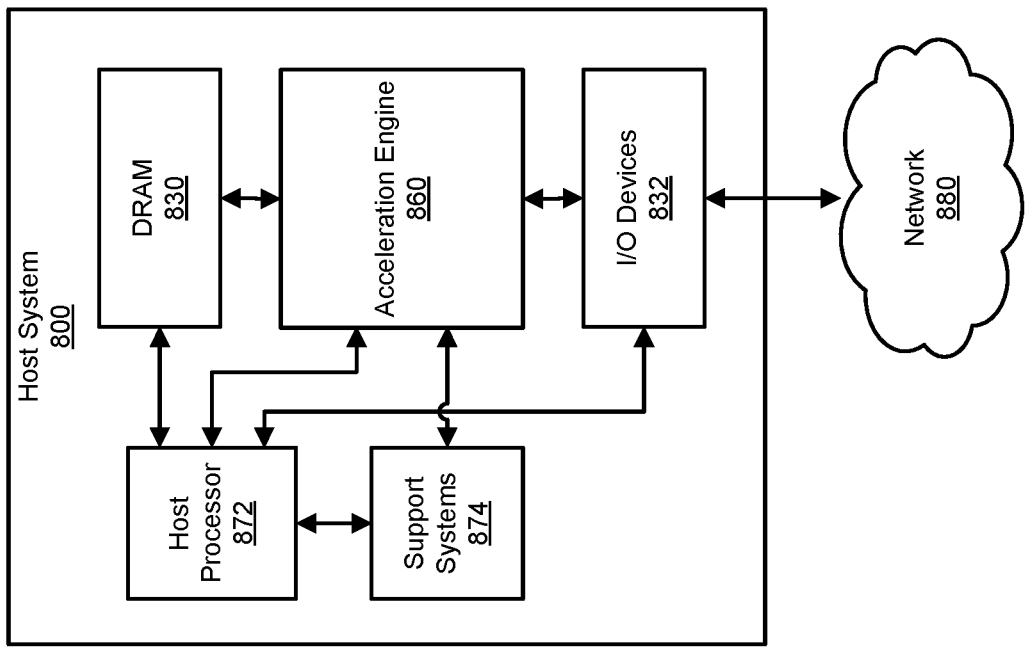
FIG. 8 illustrates a block diagram of an example of a host system.

FIG. 8 includes a block diagram that illustrates an example of a host system 800 in which an acceleration engine 860 can be used. The acceleration engine 860 of FIG. 8 is an example of a device that can include one or more accelerators such as is illustrated in FIG. 7. The example host system 800 of FIG. 8 includes the acceleration engine 860, a host processor 872, DRAM 830 or processor memory, I/O devices 832, and support systems 874. In various implementations, the host system 800 can include other hardware that is not illustrated here.

The host processor 872 is a general purpose integrated circuit that is capable of executing program instructions. In some examples, the host processor 872 can include multiple processing cores. A multi-core processor may include multiple processing units within the same processor. In some examples, the host system 800 can include more than one host processor 872. In some examples, the host processor 872 and the acceleration engine 860 can be one chip, such as, one or more integrated circuits within the same package.

In various examples, the host processor 872 can communicate with other components in the host system 800 over one or more communication channels. For example, the host system 800 can include a host processor bus, which the host processor 872 can use to communicate with the DRAM 830, for example. As another example, the host system 800 can include an I/O bus, such as a PCI-based bus, over which the host processor 872 can communicate with the acceleration engine 860 and/or the I/O devices 832, for example. In various examples, the host system 800 can, alternatively or additionally, include other communication channels or busses, such as serial busses, power management busses, storage device busses, and so on.

In some examples, software programs executing on the host processor 872 can receive or generate input for processing by the acceleration engine 860. In some examples, the programs can select an appropriate neural network to execute for a given input. For example, a program may be for language translation, and can select one or more neural networks capable of speech recognition and/or machine translation. In these and other examples, the programs can configure the acceleration engine 860 with the neural network to execute, and/or can select a neural network processing engine on the acceleration engine 860 that has previously been configured to execute the desired neural network. In some examples, once the acceleration engine 860 has started an inference on input data, the host processor 872 can manage the movement of data (such as weights, instructions, intermediate results, results of conditional layers, and/or final results) into or out of the acceleration engine 860.

In some examples, a software program that is using the acceleration engine 860 to conduct an inference can read the result from a conditional layer from the acceleration engine 860 and/or from a storage location, such as in DRAM 830. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 830 is memory that is used by the host processor 872 for storage of program code that the host processor 872 is in the process of executing, as well as values that are being operated on. In some examples, the data for a neural network (e.g., weight values, instructions, and other data) can be all or partially stored in the DRAM 830. DRAM is a common term for processor memory, and though DRAM is volatile memory, processor memory can be volatile and/or non-volatile. Though not illustrated here, the host system 800 can include other volatile and non-volatile memories for other purposes. For example, the host system 800 can include a Read-Only Memory (ROM) that stores boot code for booting the host system 800 at power on, and/or Basic Input/Output System (BIOS) code.

Though not illustrated here, the DRAM 830 can store instructions for various programs, which can be loaded into and be executed by the host processor 872. For example, the DRAM 830 can be storing instructions for an operating system, one or more data stores, one or more application programs, one or more drivers, and/or services for implementing the features disclosed herein.

The operating system can manage and orchestrate the overall operation of the host system 800, such as scheduling tasks, executing applications, and/or controller peripheral devices, among other operations. In some examples, a host system 800 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 800. For example, some drivers can provide communication between the operating system and peripheral devices or I/O devices 832. Alternatively or additionally, some drivers may provide communication between application programs and the operating system, and/or application programs and peripheral devices accessible to the host system 800. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 832 can include hardware for connecting to user input and output devices, such as keyboards, mice, pens, tablets, voice input devices, touch input devices, displays or monitors, speakers, and printers, among other devices. The I/O devices 832 can also include storage drives and/or network interfaces for connecting to a network 880. For example, the host system 800 can use a network interface to communicate with storage devices, user terminals, other computing devices or servers, and/or other networks, among various examples.

In various examples, one or more of the I/O devices 832 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 800 or may be in an external enclosure. A storage device can be fixed (e.g., attached by screws) or removable (e.g., having a physical release mechanism and possibly a hot-plug mechanism).

Storage devices, the DRAM 830, and any other memory component in the host system 800 are examples of computer-readable storage media. Computer-readable storage media are physical mediums that are capable of storing data in a format that can be read by a device such as the host processor 872. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 832 can be PCI-based devices. In these examples, a PCI-based I/O device includes a PCI interface for communicating with the host system 800. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 874 can include hardware for coordinating the operations of the acceleration engine 860. For example, the support systems 874 can include a microprocessor that coordinates the activities of the acceleration engine 860, including moving data around on the acceleration engine 860. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 872. In some examples, the program executed by the microprocessor is stored on the hardware of microprocessor, or on a non-volatile memory chip in the host system 800. In some examples, the microprocessor and the acceleration engine 860 can be on chip, such as one integrated circuit on the same die and in the same package.

In some examples, the support systems 874 can be responsible for taking instructions from the host processor 872 when programs executing on the host processor 872 request the execution of a neural network. For example, the host processor 872 can provide the support systems 874 with a set of input data and a task that is to be performed on the set of input data. In this example, the support systems 874 can identify a neural network that can perform the task, and can program the acceleration engine 860 to execute the neural network on the set of input data. In some examples, the support systems 874 only needs to select an appropriate neural network processing engine of the neural network processor. In some examples, the support systems 874 may need to load the data for the neural network onto the acceleration engine 860 before the acceleration engine 860 can start executing the neural network. In these and other examples, the support systems 874 can further receive the output of executing the neural network, and provide the output back to the host processor 872.

In some examples, the operations of the support systems 874 can be handled by the host processor 872. In these examples, the support systems 874 may not be needed and can be omitted from the host system 800.

In various examples, the host system 800 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 800 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 9:
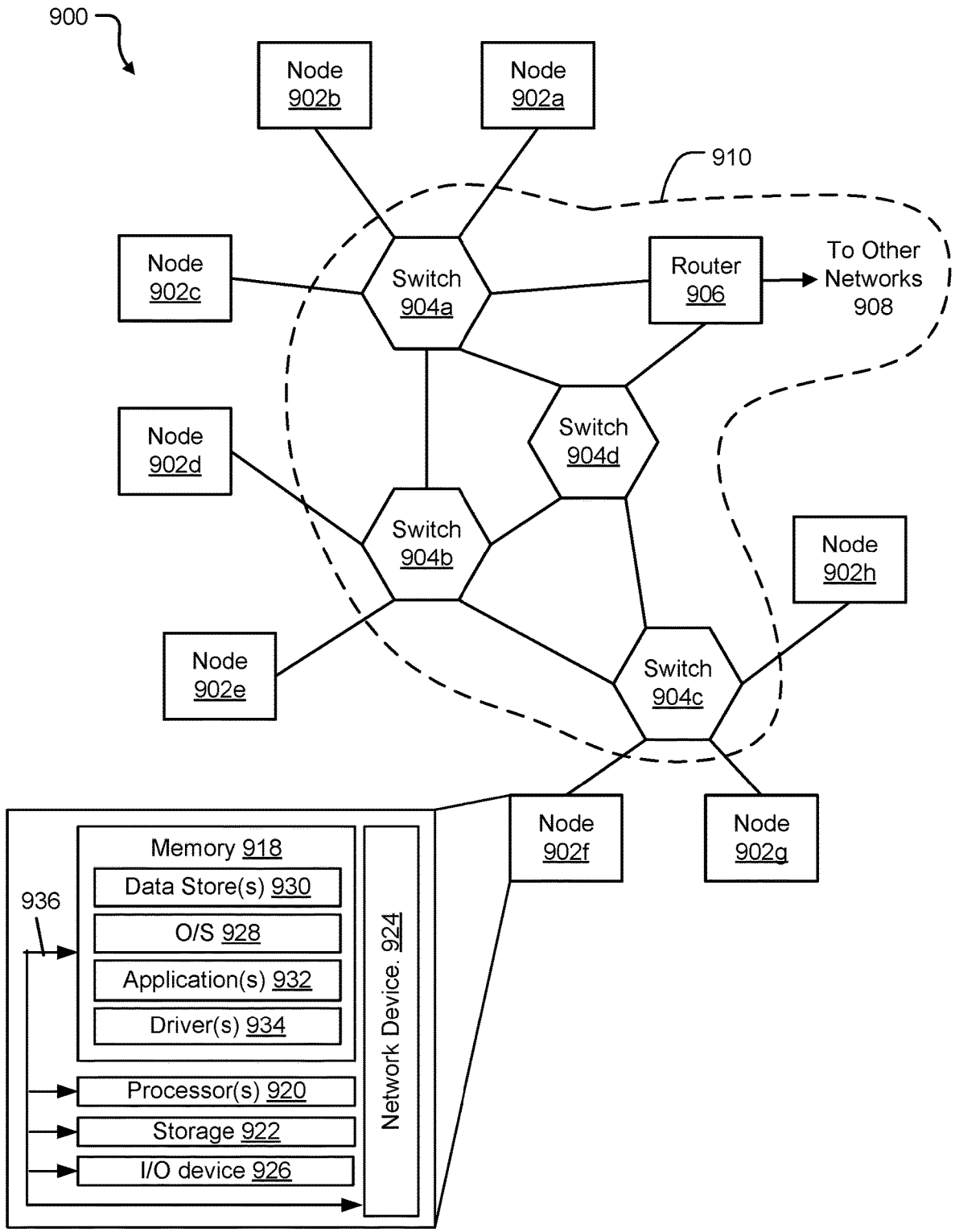
FIG. 9 includes a diagram of an example network.

FIG. 9 includes a diagram of an example network 900, which can include one or more host systems, such as the host system illustrated in FIG. 8. For example, the example network 900 of FIG. 9 includes multiple nodes 902a-902h, one or more of which can be a host system such as is illustrated in FIG. 8. Others of the nodes 902a-902h can be other computing devices, each of which include at least a memory for storing program instructions, a processor for executing the instructions, and a network interface for connecting to the network 900.

In various examples, the network 900 can be used to process data. For example, input data can be received at one of the nodes 902a-902h or from other networks 908 with which the network 900 can communicate. In this example, the input data can be directed to a node in the network 900 that includes an acceleration engine, for the acceleration engine to operate on and produce a result. The result can then be transferred to the node or other network from which the input data was received. In various examples, input data can be accumulated from various sources, including one or more of the nodes 902a-902h and/or computing devices located in the other networks 908, and the accumulated input data can be directed to one or more host systems in the network 900. Results from the host systems can then be distributed back to the sources from which the input data was gathered.

In various examples, one or more of the nodes 902a-902h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 9, the nodes 902a-902h are connected to one another using a switched architecture with point-to point links. The switched architecture includes multiple switches 904a-904d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 904a-904d of FIG. 9 may be connected to the nodes 902a-902h and provide multiple paths between any two nodes.

The network 900 may also include one or more network devices for connection with other networks 908, such as a router 906. Routers use headers and forwarding tables to determine the best path for forwarding the packets, and use protocols such as internet control message protocol (ICMP) to communicate with each other and configure the best route between any two devices. The router 906 of FIG. 9 can be used to connect to other networks 908 such as subnets, LANs, wide area networks (WANs), and/or the Internet.

In some examples, network 900 may include any one or a combination of many different types of networks, such as cable networks, the Internet, wireless networks, cellular networks and other private and/or public networks. The interconnected switches 904a-904d and the router 906, if present, may be referred to as a switch fabric 910, a fabric, a network fabric, or simply a network. In the context of a computer network, terms "fabric" and "network" may be used interchangeably herein.

The nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for avoiding uncorrectable errors in a memory device, the method comprising:
   collecting historic error data of multiple memory devices of a same type from a collection of computing devices, the historic error data including usage patterns and correctable error rates that precede uncorrectable errors;
   storing the historic error data at a centralized database;
   determining a page migration condition based on the historic error data;
   monitoring memory accesses and correctable errors of a memory page of a memory device of the same type;
   determining that the memory accesses and the correctable errors of the memory page satisfy the page migration condition;
   preventing write accesses from reaching a memory controller of the memory device;
   reading data stored at the memory page;
   writing the data to a reserved page of the memory device; and
   updating a mapping table to replace accesses to the memory page with accesses to the reserved page.

2. The method of claim 1, wherein the multiple memory devices are high bandwidth memory (HBM) devices from a same manufacturer.

3. The method of claim 1, wherein the reading and the writing are performed by a coprocessor of a system-on-chip (SoC) that includes the memory device.

4. The method of claim 3, wherein information on the correctable errors of the memory page are stored in an on-chip static random access memory of the SoC.

5. A method comprising:
   detecting a correctable error pattern of a memory page of a memory device;
   determining that the correctable error pattern of the memory page satisfies a page migration condition;
   preventing write accesses to the memory page from reaching a memory controller of the memory device;
   migrating contents of the memory page to a reserved page; and
   updating a mapping table to replace accesses to the memory page with accesses to the reserved page,
   wherein the page migration condition is based on historic error data collected from memory devices of a same type as the memory device across a collection of computing systems.

6. The method of claim 5, wherein the historic error data includes rates of correctable errors preceding occurrences of uncorrectable errors.

7. The method of claim 6, wherein the historic error data includes temperature information associated with the correctable errors.

8. The method of claim 6, wherein the historic error data includes an age of the memory device when the correctable errors were detected.

9. The method of claim 6, wherein the historic error data includes memory usage patterns.

10. The method of claim 9, wherein the memory usage patterns include a number of bytes read or written per memory page during a time window.

11. The method of claim 5, wherein detecting the correctable error pattern includes storing correctable error information of the memory page in an on-chip memory of a system-on-chip that includes the memory device.

12. The method of claim 11, wherein the correctable error information includes information on correctable errors detected by the memory device, or correctable errors detected by a memory interface circuit external to the memory device.

13. The method of claim 11, wherein migrating contents of the memory page includes using a coprocessor to copy data from the memory page to the reserved page.

14. The method of claim 5, wherein the memory device is a high bandwidth memory (HBM) device.

15. An integrated circuit comprising:
a memory device;
a processing circuit that performs computations and store data in the memory device; and
a coprocessor configured to:
   detect a correctable error pattern of a memory page of the memory device;
   determine that the correctable error pattern of the memory page satisfies a page migration condition;
   migrate contents of the memory page to a reserved page; and
   update a mapping table to replace accesses to the memory page with accesses to the reserved page,
wherein the page migration condition is based on historic correctable error rates that precede occurrences of uncorrectable error in memory devices of a same type as the memory device, the historic correctable error rates obtained from a collection of computing systems.

16. The integrated circuit of claim 15, wherein the coprocessor is configured to store correctable error information for each memory page of the memory device in an on-chip memory of the integrated circuit.

17. The integrated circuit of claim 16, wherein the correctable error information includes time and temperature information associated with correctable errors of the memory device.

18. The integrated circuit of claim 16, wherein the memory device includes dynamic random access memories, and the on-chip memory is a static random access memory or flash memory.

* * * * *